(12) United States Patent
Hedman et al.

(10) Patent No.: US 12,739,735 B2
(45) Date of Patent: Sep. 15, 2026

(54) ENSURING NETWORK CONTROL OF SIMULTANEOUS ACCESS TO NETWORK SLICES WITH APPLICATION AWARENESS

(71) Applicant: Telefonaktiebolaget LM Ericsson (publ), Stockholm (SE)

(72) Inventors: Peter Hedman, Helsingborg (SE); Ralf Keller, Würselen (DE); Maria Belen Pancorbo Marcos, Madrid (ES); George Foti, Dollard des Ormeaux (CA); Divya Peddireddy, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 489 days.

(21) Appl. No.: 18/029,931

(22) PCT Filed: Sep. 17, 2021

(86) PCT No.: PCT/IB2021/058515
§ 371 (c)(1),
(2) Date: Apr. 3, 2023

(87) PCT Pub. No.: WO2022/069989
PCT Pub. Date: Apr. 7, 2022

(65) Prior Publication Data

US 2023/0388909 A1 Nov. 30, 2023

Related U.S. Application Data

(60) Provisional application No. 63/086,657, filed on Oct. 2, 2020.

(51) Int. Cl.
*H04W 48/16* (2009.01)
*H04W 8/08* (2009.01)
*H04W 60/00* (2009.01)

(52) U.S. Cl.
CPC ............ *H04W 48/16* (2013.01); *H04W 8/08* (2013.01); *H04W 60/00* (2013.01)

(58) Field of Classification Search
CPC ....... H04W 48/16; H04W 8/08; H04W 60/00; H04W 40/02; H04W 8/00; H04W 8/02;
(Continued)

(56) References Cited

U.S. PATENT DOCUMENTS

2021/0037380 A1* 2/2021 Lee ....................... H04W 60/00
2021/0112127 A1 4/2021 Zhu et al.
(Continued)

FOREIGN PATENT DOCUMENTS

WO 2020001518 A1 1/2020

OTHER PUBLICATIONS

Author Unknown, "Technical Specification Group Services and System Aspects; Study on enhancement of network slicing; Phase 2 (Release 17)," Technical Report 23.700-40, Version 1.0.0, Sep. 2020, 3GPP Organizational Partners, 191 pages.
(Continued)

*Primary Examiner* — Yuwen Pan
*Assistant Examiner* — Samuel H. Leonard
(74) *Attorney, Agent, or Firm* — Withrow & Terranova, PLLC

(57) ABSTRACT

Systems and methods are disclosed herein for ensuring network control of simultaneous access to network slices with application awareness. In one embodiment, a method performed in a cellular communications system comprises, at a wireless communication device, sending, to a Policy and Control Function (PCF) via an Access and Mobility Management Function (AMF), application identifiers (IDs) of applications used by the wireless communication device and receiving, from the PCF via the AMF, one or more User Equipment (UE) Route Selection Policy (URSP) rules that
(Continued)

are based on the application IDs. The method further comprises, at the PCF, obtaining information about one or more mutually exclusive network slices, generating the one or more URSP rules based on the application IDs and the information about the one or more mutually exclusive network slices, and sending the one or more URSP rules to the wireless communication device via the AMF.

19 Claims, 10 Drawing Sheets

(58) Field of Classification Search

CPC ..... H04W 48/00; H04W 48/08; H04W 48/18; H04W 60/005; H04W 12/00; H04W 12/06; H04W 12/062; H04W 12/065; H04W 12/10; H04W 12/102; H04W 16/00; H04W 16/02; H04W 16/10; H04W 16/18; H04W 28/00; H04W 28/02; H04W 28/0215; H04W 40/00; H04L 45/306; H04L 45/00

See application file for complete search history.

(56) References Cited

U.S. PATENT DOCUMENTS

2022/0110023 A1* 4/2022 Wu ........................ H04W 40/02
2022/0159605 A1* 5/2022 Li .......................... H04W 60/00
2022/0201543 A1* 6/2022 Zhu ................... H04W 28/0925
2022/0217611 A1* 7/2022 Lu ......................... H04W 40/20
2022/0264444 A1* 8/2022 Ryu ....................... H04W 60/06
2022/0272620 A1* 8/2022 Ninglekhu ............ H04W 60/00
2022/0330361 A1* 10/2022 Ding ..................... H04W 48/10
2022/0353780 A1* 11/2022 Kodali .................. H04W 40/24
2023/0037031 A1* 2/2023 Wang ...................... H04W 8/08
2023/0247541 A1* 8/2023 Liu ........................ H04W 48/18
370/329
2023/0319528 A1* 10/2023 Pateromichelakis . H04W 48/18
455/420
2024/0281719 A1* 8/2024 Duan ..................... G06N 20/20

OTHER PUBLICATIONS

Author Unknown, "Technical Specification Group Services and System Aspects; Procedures for the 5G System (5GS); Stage 2 (Release 16)," Technical Specification 23.502, Version 16.6.0, Sep. 2020, 3GPP Organizational Partners, 597 pages.

Author Unknown, "Technical Specification Group Services and System Aspects; Policy and charging control framework for the 5G System (5GS); Stage 2 (Release 16)," Technical Specification 23.503, Version 16.6.0, Sep. 2020, 3GPP Organizational Partners, 118 pages.

International Search Report and Written Opinion for International Patent Application No. PCT/IB2021/058515, mailed Dec. 20, 2021, 21 pages.

International Preliminary Report on Patentability for International Patent Application No. PCT/IB2021/058515, mailed Jan. 16, 2023, 39 pages.

* cited by examiner

ENSURING NETWORK CONTROL OF SIMULTANEOUS ACCESS TO NETWORK SLICES WITH APPLICATION AWARENESS

RELATED APPLICATIONS

This application is a 35 U.S.C. § 371 national phase filing of International Application No. PCT/IB2021/058515, filed Sep. 17, 2021, which claims the benefit of provisional patent application Ser. No. 63/086,657, filed Oct. 2, 2020, the disclosures of which are hereby incorporated herein by reference in their entireties.

TECHNICAL FIELD

The present disclosure relates to network slicing in a cellular communications system and, more specifically, control of simultaneous access to network slices with application awareness.

BACKGROUND

The Release 17 Third Generation Partnership Project (3GPP) Technical Report (TR) 23.700-40, which is entitled "Study on enhancement of network slicing," describes a Key Issue #6, entitled "Constraints on simultaneous use of the network slice." Many solutions are described in the TR on how to enforce the constraints related to simultaneous usage of network slices in the User Equipment (UE) and in the network, both in roaming and non-roaming scenarios. However, most of the solutions in the TR propose to send the network slice configuration information to the UE. However, keeping the control and information regarding the slice configuration at the network side is beneficial as one should avoid sending or disclosing such information to the UE.

SUMMARY

Systems and methods are disclosed herein for ensuring network control of simultaneous access to network slices with application awareness. In one embodiment, a method performed in a cellular communications system to handle mutually exclusive network slices comprises, at a wireless communication device, sending, to an Access and Mobility Management Function (AMF), application identifiers (IDs) of applications used by the wireless communication device and receiving, from a Policy and Control Function (PCF) via the AMF, one or more User Equipment (UE) Route Selection Policy (URSP) rules that are based on the application IDs. The method further comprises, at the AMF, receiving, from the wireless communication device, the application IDs of the applications used by the wireless communication device and sending, to the PCF, the application IDs of the applications used by the wireless communication device. The method further comprises, at the PCF, receiving, from the AMF, the application IDs of the applications used by the wireless communication device, obtaining information about one or more mutually exclusive network slices, generating the one or more URSP rules for the wireless communication device based on the application IDs of the applications used by the wireless communication device and the information about the one or more mutually exclusive network slices, and sending the one or more URSP rules to the wireless communication device via the AMF. In this manner, network control can be ensured when the wireless communication device desires to access mutually exclusive network slices simultaneously.

In one embodiment, the method further comprises, at the wireless communication device, sending, to the AMF, an indication that the wireless communication device has a capability to provide the application IDs of the applications used by the wireless communication device. In one embodiment, sending the indication comprises sending a registration request to the AMF, the registration request comprising the indication.

In one embodiment, the method further comprises, at the wireless communication device, receiving a request for the application IDs from the AMF, wherein sending the application IDs of applications used by the wireless communication device to the AMF comprises sending the application IDs to the AMF in response to the request. In one embodiment, the application IDs are sent from the wireless communication device to the AMF during a registration procedure, and at the wireless communication device, receiving the request for the application IDs comprises receiving an identity request message from the AMF comprising the request for the application IDs and sending the application IDs to the AMF comprises sending an identity response message to the AMF in response to the identity request, the identity response message comprising the application IDs.

In one embodiment, at the wireless communication device, sending the application IDs of applications used by the wireless communication device to the AMF comprises sending a registration request to the AMF, the registration request comprising the application IDs.

In one embodiment, the one or more URSP rules comprise information that indicates that at least one of the applications identified by the application IDs cannot be used.

In one embodiment, the one or more URSP rules comprise information that indicates that at least one of the applications identified by the application IDs cannot be used with mutually exclusive network slices.

In one embodiment, the method further comprises, at the AMF, storing the application IDs in association with an identity of the wireless communication device.

In one embodiment, the method further comprises, at the AMF, storing the application IDs in a context of the wireless communication device.

In one embodiment, the one or more URSP rules include URSP rules only for application IDs associated to network slices that are not mutually exclusive.

In one embodiment, a method performed by a wireless communication device for a cellular communications system comprises sending, to an AMF, application IDs of applications used by the wireless communication device and receiving, from a PCF via the AMF, one or more URSP rules that are based on the application IDs. In one embodiment, the method further comprises sending, to the AMF, an indication that the wireless communication device has a capability to provide the application IDs of the applications used by the wireless communication device. In one embodiment, sending the indication comprises sending a registration request to the AMF, the registration request comprising the indication.

In one embodiment, the method further comprises receiving a request for the application IDs from the AMF, wherein sending the application IDs of applications used by the wireless communication device to the AMF comprises sending the application IDs to the AMF in response to the request. In one embodiment, the application IDs are sent from the wireless communication device to the AMF during a registration procedure, receiving the request for the application IDs comprises receiving an identity request message from the AMF comprising the request for the application IDs, and sending the application IDs to the AMF comprises sending an identity response message to the AMF in response to the identity request, the identity response message comprising the application IDs.

In one embodiment, sending the application IDs of applications used by the wireless communication device to the AMF comprises sending a registration request to the AMF, the registration request comprising the application IDs.

In one embodiment, the one or more URSP rules comprise information that indicates that at least one of the applications identified by the application IDs cannot be used.

In one embodiment, the one or more URSP rules include URSP rules only for application IDs associated to network slices that are not mutually exclusive.

Corresponding embodiments of a wireless communication device are also disclosed. In one embodiment, a wireless communication device is adapted to send, to an AMF, application IDs of applications used by the wireless communication device and receive, from a PCF via the AMF, one or more URSP rules that are based on the application IDs.

In another embodiment, a wireless communication device comprises one or more transmitters, one or more receivers, and processing circuitry associated with the one or more transmitters and the one or more receivers. The processing circuitry is configured to cause the wireless communication device to send, to an AMF, application IDs of applications used by the wireless communication device and receive, from a PCF via the AMF, one or more URSP rules that are based on the application IDs.

Embodiments of a method performed by an AMF for a cellular communications system are also disclosed. In one embodiment, a method performed by an AMF for a cellular communications system comprises receiving, from a wireless communication device, application IDs of the applications used by the wireless communication device and send, to a PCF, the application IDs of the applications used by the wireless communication device.

In one embodiment, the method further comprises receiving, from the wireless communication device, an indication that the wireless communication device has a capability to provide the application IDs of the applications used by the wireless communication device. In one embodiment, receiving the indication comprises receiving a registration request from the wireless communication device, the registration request comprising the indication.

In one embodiment, the method further comprises sending a request for the application IDs to the wireless communication device, wherein receiving the application IDs of applications used by the wireless communication device from the wireless communication device comprises receiving the application IDs from the wireless communication device in response to the request. In one embodiment, the application IDs are received from the wireless communication device during a registration procedure, sending the request for the application IDs comprises sending an identity request message to the wireless communication device comprising the request for the application IDs, and receiving the application IDs comprises receiving an identity response message from the wireless communication device in response to the identity request, the identity response message comprising the application IDs.

In one embodiment, receiving the application IDs of applications used by the wireless communication device from the wireless communication device comprises receiving a registration request from the wireless communication device, the registration request comprising the application IDs.

In one embodiment, the method further comprises storing the application IDs in association with an identity of the wireless communication device.

In one embodiment, the method further comprises storing the application IDs in a context of the wireless communication device.

Corresponding embodiments of an AMF for a cellular communications system are also disclosed. In one embodiment, an AMF for a cellular communications system is adapted to receive, from a wireless communication device, application IDs of applications used by the wireless communication device and send, to a PCF, the application IDs of the applications used by the wireless communication device.

In another embodiment, a network node for implementing an AMF for a cellular communications system comprises processing circuitry configured to cause the network node to receive, from a wireless communication device, application IDs of applications used by the wireless communication device and send, to a PCF, the application IDs of the applications used by the wireless communication device.

Embodiments of a method performed by a PCF for a cellular communications system are also disclosed. In one embodiment, a method performed by a PCF for a cellular communications system comprises receiving, from an AMF, application IDs of applications used by a wireless communication device, obtaining information about one or more mutually exclusive network slices, generating one or more URSP rules for the wireless communication device based on the application IDs of the applications used by the wireless communication device and the information about the one or more mutually exclusive network slices, and sending the one or more URSP rules to the wireless communication device via the AMF.

In one embodiment, the one or more URSP rules comprise information that indicates that at least one of the applications identified by the application IDs cannot be used.

In one embodiment, the one or more URSP rules include URSP rules only for application IDs associated to network slices that are not mutually exclusive.

Corresponding embodiments of a PCF for a cellular communications system are also disclosed. In one embodiment, a PCF for a cellular communications system is adapted to receive, from an AMF, application IDs of applications used by a wireless communication device, obtain information about one or more mutually exclusive network slices, generate one or more URSP rules for the wireless communication device based on the application IDs of the applications used by the wireless communication device and the information about the one or more mutually exclusive network slices, and send the one or more URSP rules to the wireless communication device via the AMF.

In another embodiment, a network node for implementing a PCF for a cellular communications system comprises processing circuitry configured to cause the network node to receive, from an AMF, application IDs of applications used by a wireless communication device, obtain information about one or more mutually exclusive network slices, generate one or more URSP rules for the wireless communication device based on the application IDs of the applications used by the wireless communication device and the information about the one or more mutually exclusive network slices, and send the one or more URSP rules to the wireless communication device via the AMF.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
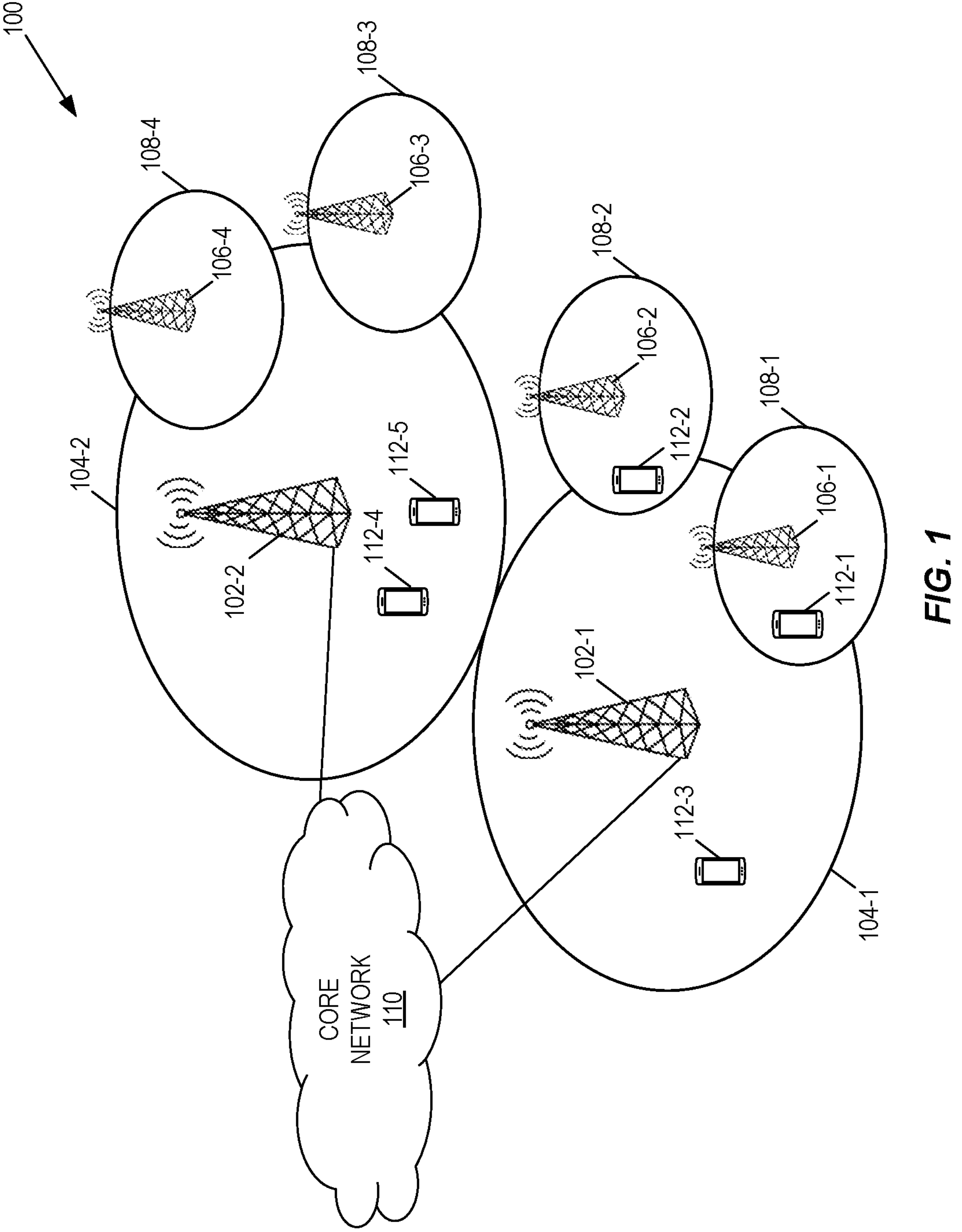
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Mutually Exclusive Network Slices: As used herein, two (or more) network slices are mutually exclusive if they cannot be used (e.g., by a wireless communication device such as, e.g., a UE) at the same time (i.e., simultaneously) for any reason (e.g., security related reason, privacy related reason, performance related reason, etc.).

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

The Release 17 Third Generation Partnership Project (3GPP) Technical Report (TR) 23.700-40, which is entitled "Study on enhancement of network slicing," describes a Key Issue #6, entitled "Constraints on simultaneous use of the network slice." Many solutions are described in the TR on how to enforce the constraints related to simultaneous usage of network slices in the User Equipment (UE) and in the network, both in roaming and non-roaming scenarios. However, most of the solutions in the TR propose to send the network slice configuration information to the UE. However, keeping the control and information regarding the slice configuration at the network side is beneficial as one should avoid sending or disclosing such information to the UE.

There currently exist certain challenge(s). One proposal regarding Key Issue #6 in 3GPP TR 23.700-40 is to send a list of mutually exclusive network slices to the UE as network slice configuration information. However, doing this discloses the network configuration to the UE, which is something that operators may want to avoid Certain aspects of the present disclosure and their embodiments may provide solutions to the aforementioned or other challenges. Embodiments of the solution disclosed herein address the above problem by applying the current UE Route Selection Policy (URSP) model, where the UE has the Application Identifiers (IDs) for the applications the UE wants to use, so as to enable delivery of optimal URSP rules to the UE.

A new solution is required to ensure network control when the UE needs to access mutually exclusive network slices simultaneously by utilizing the present URSP model. Currently, the URSP rules are provided to the UE to use, amongst others, specific network slices (e.g., network slices identified by respective Single Network Slice Selection Assistance Informations (S-NSSAIs)) for certain applications. However, certain network slices cannot be used simultaneously due to the mutually exclusive nature of the network slices, and this mutually exclusive nature of the network slices is currently not verified at the network side when/before sending URSP rules to the UE. Further, if the UE has such network slices to which it is subscribed, there is a need for the network to verify the mutually exclusive nature of the network slices and provide as good connectivity as possible for the applications the UE wishes to use.

One embodiment of the solution disclosed herein is implemented in a Fifth Generation System (5GS) and is as follows:

- At the UE:
  - The UE indicates to the network (e.g., to the RAN or AMF) its capability of providing Application IDs that are available.
  - The UE has the capability of providing the application (e.g., providing the Application ID of the application) it wishes to use to the network.
- At the AMF:
  - The AMF requests Application IDs from the UE.
  - The AMF has the ability to store the Application ID information (e.g., Application IDs reported by a UE) associated with a UE, e.g., as part of a stored UE context for that UE.
- At the PCF:
  - The PCF receives a list of Application IDs that the UE supports as input to generate URSP rules.
  - The PCF retrieves a list of mutually exclusive network slices (e.g., from Unified Data Repository (UDR)) as input to generate URSP rules.
  - The PCF generates a new URSP rule (e.g., based on the list of Application IDs and the list of mutually exclusive network slices) with the possibility of informing the UE about whether the requested applications can be used (e.g., simultaneously) or not.

Certain embodiments may provide one or more of the following technical advantage(s). Example advantages of embodiments of the proposed solution are as follows:

- Embodiments of the proposed solution avoid disclosing network configuration information to the UE.
- Embodiments of the proposed solution ensure network control when the UE needs to access mutually exclusive network slices simultaneously.
- Embodiments of the proposed solution provide new and enhanced capability in the Fifth Generation Core (5GC) network to verify the network slice configuration of a UE for mutually exclusive nature.
- Embodiments of the proposed solution provide new and enhanced capability in the UE to indicate to the network its Application IDs it is currently using or wishes to use.
- Embodiments of the proposed solution utilize and re-use the existing 3GPP procedures/mechanisms and the current URSP model.
- Embodiments of the proposed solution can be used an input for future standardization in 3GPP.

FIG. 1 illustrates one example of a cellular communications system 100 in which embodiments of the present disclosure may be implemented. In the embodiments described herein, the cellular communications system 100 is a 5GS including a Next Generation RAN (NG-RAN) and a 5GC. In this example, the RAN includes base stations 102-1 and 102-2, which in the 5GS include NR base stations (gNBs) and optionally next generation eNBs (ng-eNBs) (e.g., LTE RAN nodes connected to the 5GC), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5G System (5GS) is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs and as such sometimes referred to herein as UEs 112, but the present disclosure is not limited thereto.

Figure 2:
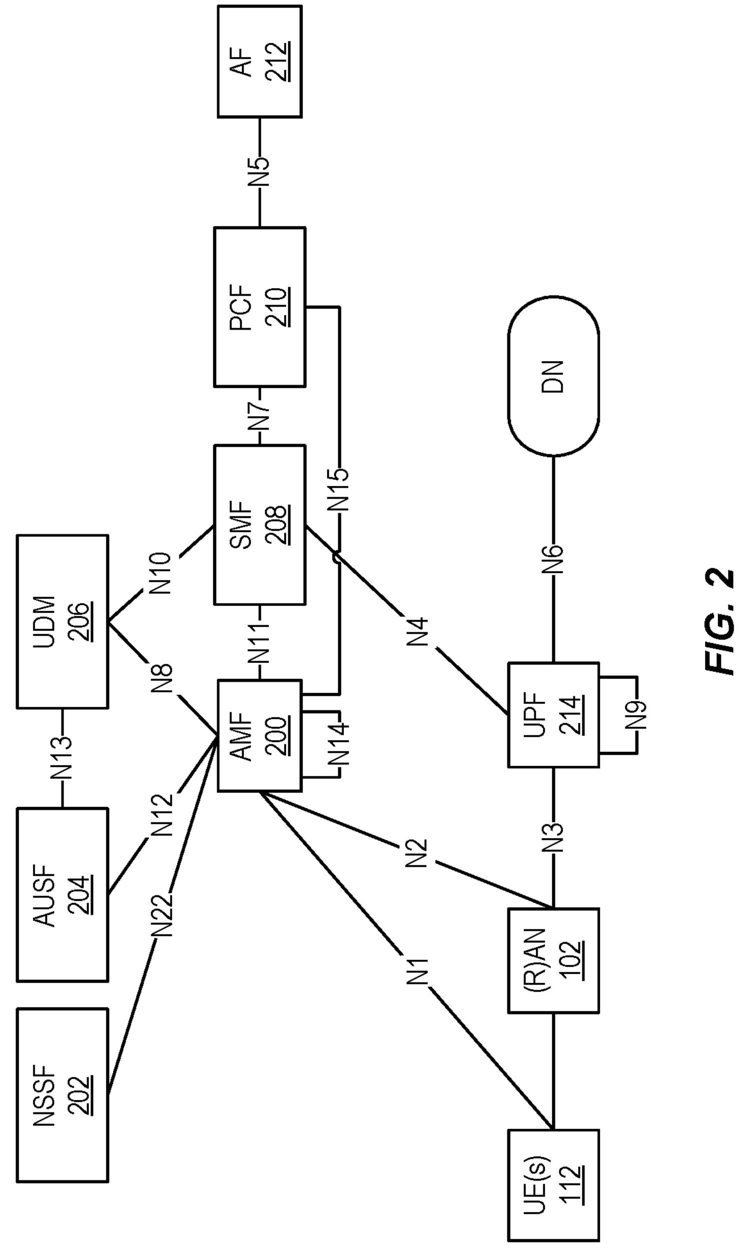
FIGS. 2 and 3 illustrate example embodiments of the cellular communications system of FIG. 1 in which the cellular communications system is a Fifth Generation System (5GS)

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs 112 connected to either a RAN 102 or an Access Network (AN) as well as an AMF 200. Typically, the R(AN) 102 comprises base stations, e.g. such as eNBs or gNBs or similar. Seen from the core network side, the 5GC NFs shown in FIG. 2 include a NSSF 202, an AUSF 204, a UDM 206, the AMF 200, a SMF 208, a PCF 210, and an Application Function (AF) 212.

Reference point representations of the 5G network architecture are used to develop detailed call flows in the normative standardization. The N1 reference point is defined to carry signaling between the UE 112 and AMF 200. The reference points for connecting between the AN 102 and AMF 200 and between the AN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and SMF 208.

The 5GC network aims at separating UP and CP. The UP carries user traffic while the CP carries signaling in the network. In FIG. 2, the UPF 214 is in the UP and all other NFs, i.e., the AMF 200, SMF 208, PCF 210, AF 212, NSSF 202, AUSF 204, and UDM 206, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 200 and SMF 208 are independent functions in the CP. Separated AMF 200 and SMF 208 allow independent evolution and scaling. Other CP functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 3:
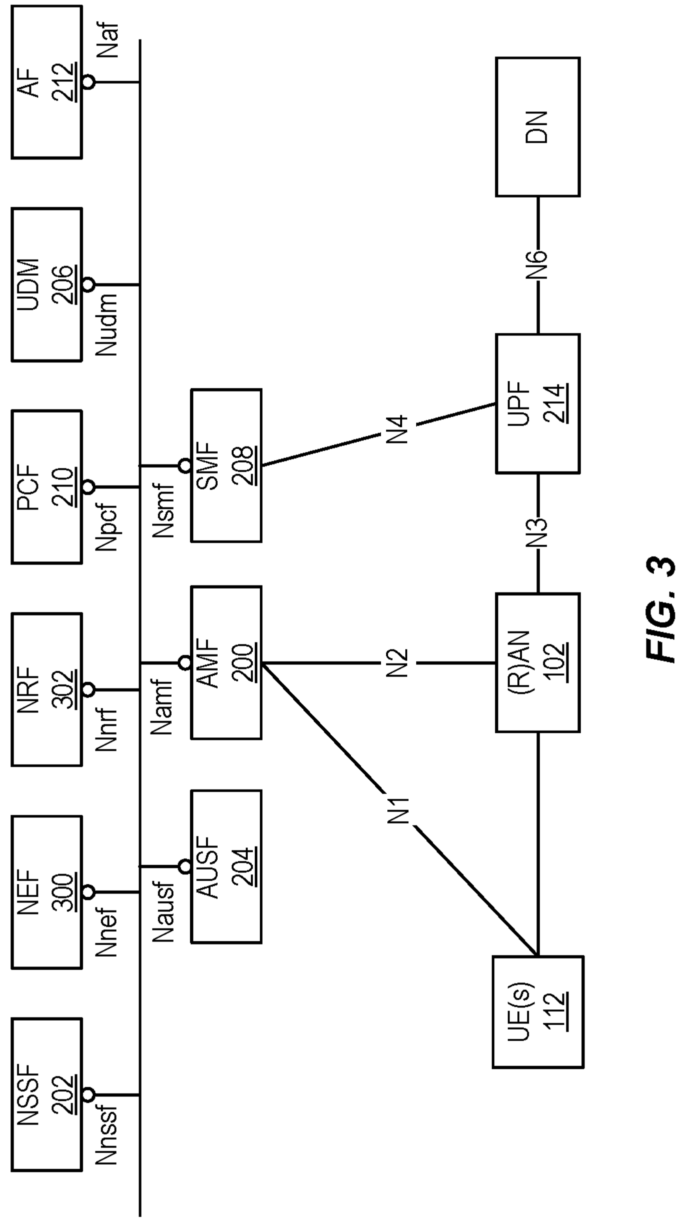

FIG. 3 illustrates a 5G network architecture using service-based interfaces between the NFs in the CP, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF 200 and Nsmf for the service based interface of the SMF 208, etc. The NEF 300 and the NRF 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support QoS. Based on the information, the PCF 210 determines policies about mobility and session management to make the AMF 200 and SMF 208 operate properly. The AUSF 204 supports authentication function for UEs or similar and thus stores data for authentication of UEs or similar while the UDM 206 stores subscription data of the UE 112. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Now, a description of embodiments of the solution described herein will be described.

Embodiments of the solutions described herein propose a number of scenarios (or methods) for the network to verify the mutually exclusive nature of the network slices based on Application IDs that the UE 112 provides to the network. Each embodiment described below includes some assumptions to ensure the feasibility of the proposed solution.

Scenario 1

The network has a configuration of mutually exclusive slices. UDM subscription includes network slices that are incompatible or mutually exclusive from each other. The PCF 210 knows which network slices that certain applications can use. That is, the network knows which network slice is allocated to an application the UE 112 wants to use. The network provides the UE 112 via URSP with a set of rules including network slice and Application ID information.

When the UE 112 registers to the network, the UE 112 may provide an indication to the AMF 200 in Registration Request about its capability to provide Application IDs, and the network subsequently requests for the Application IDs based on this. The network (the AMF 200 based on local policy), upon knowing that the UE 112 can provide the Application IDs, initiates a request for the Application IDs from the UE 112.

Upon receiving the Application IDs from the UE 112, the AMF 200 provides this information to the PCF 210. The PCF 210 provides URSP rules to the UE 112 taking into account the Application IDs provided by the UE 112 and the mutually exclusive network slices.

The UE 112 uses the URSP rules to create a suitable Requested Network Slice Selection Assistance Information (NSSAI).

When the UE 112 changes the used applications, the UE 112 sends the used Application IDs to the network in a Registration request, and the network creates new suitable URSP rules and sends them to the UE 112. The UE 112 may create a new Requested NSSAI if suitable as per the URSP.

Figure 4A:
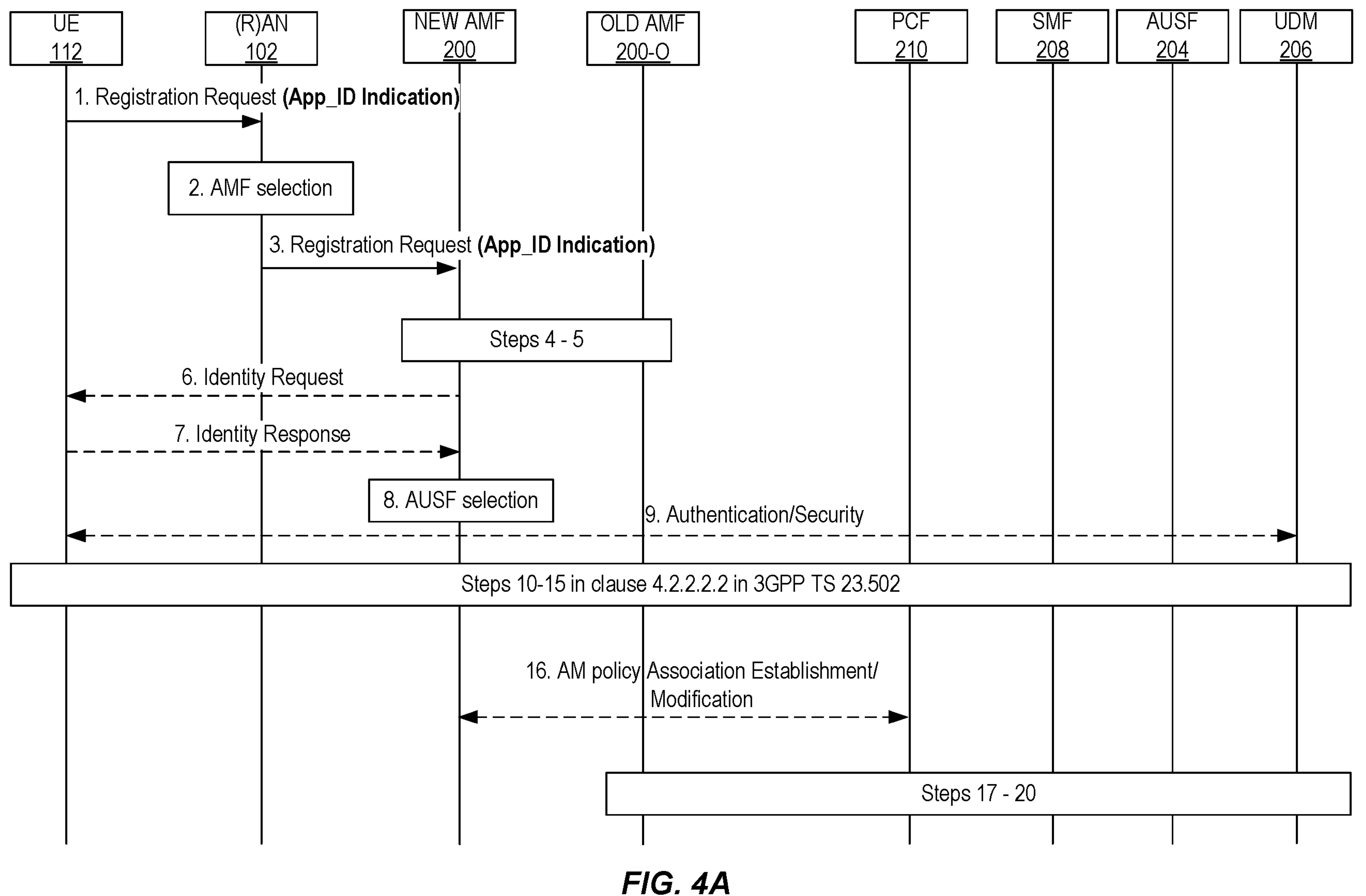
FIGS. 4A and 4B illustrate a procedure in which UE Route Selection Policy (URSP) rules are provided to a User Equipment (UE) based on applications to be used by the UE and mutually exclusive network slices, in accordance with embodiments of the present disclosure.
Figure 4B:
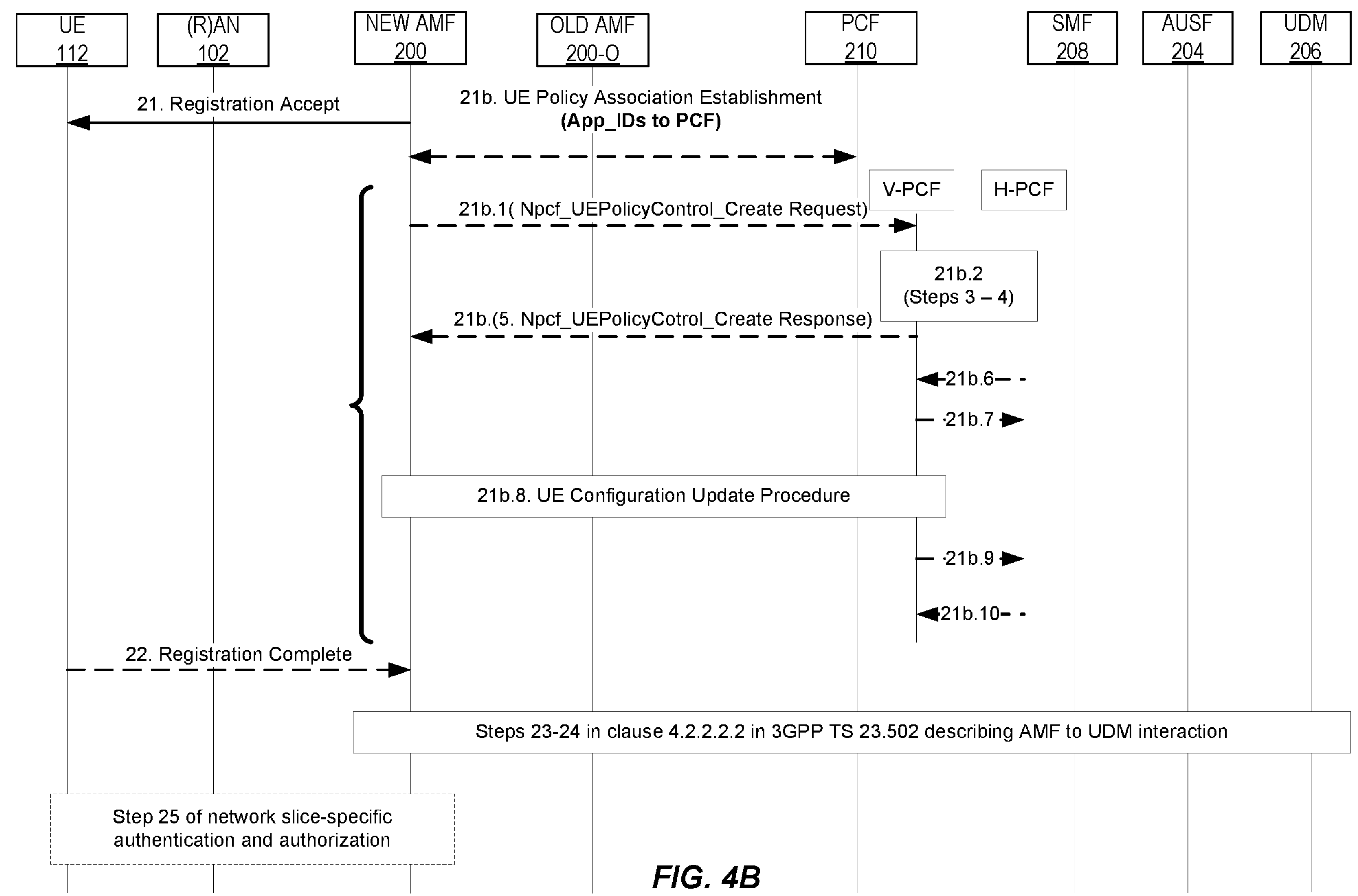

The steps described above can be realized using the existing 3GPP procedures with some modifications as illustrated in FIGS. 4A and 4B. The process of FIGS. 4A and 4B is based on the Registration Procedure described in 3GPP TS 23.502 V16.6.0 clause 4.2.2.2.2, but with the following modifications:

- Step 1: In the "Registration Request", the UE 112 includes a new capability indication to the (R)AN (e.g., to the base station 102) that indicates that the UE 112 can provide its Application IDs to the network, e.g. as part of the UE Mobility Management (MM) Core Network Capability. This new capability indication is referred to herein as an "App_ID" indication.
- Step 2: The (R)AN (e.g., the base station 102) performs AMF selection as defined in clause 4.2.2.2.2 of 3GPP TS 23.502 V16.6.0. The selected AMF is referred to here as the new AMF 200. The prior AMF is referred to herein as the old AMF 200-0.
- Step 3: The RAN sends the Registration Request, including the App_ID indication, to the selected AMF 200 within an N2 initial UE message (NAS Registration Request).
- Steps 4 and 5 are followed as defined in clause 4.2.2.2.2 of 3GPP TS 23.502 V16.6.0.
- Step 6: The AMF 200, on receiving the App_ID indication from the UE 112, requests the Application IDs from the UE 112 in the Identity Request.
- Step 7: The UE 112 sends the Identity Response to the AMF 200. The Identity Response includes its Application IDs.
- Steps 8-20 are followed as defined in clause 4.2.2.2.2.
- Step 21b: After sending the Registration Accept to the UE 112, the AMF 200 provides the Application IDs supported by the UE 112 to the PCF 210 during UE Policy Association Establishment. In one embodiment:
  - Step 21b.1: After sending the Registration Accept to the UE 112, the AMF 200 provides the Application IDs supported by the UE 112 to the PCF 210 in the Npcf_UEPolicyControl Create Request as described in step 2 of clause 4.16.11 of 3GPP TS 23.502 V16.6.0.
  - Steps 21b.2 through 21.b5: See steps 3-5 of clause 4.16.11 of 3GPP TS 23.502 V16.6.0.
  - Steps 21b.6 and 21b.7: In Step 21b.6 and 21b.7, the (H-)PCF gets the subscribed S-NSSAI from UDR and shares to the (V-)PCF as per TS 23.503, and the UDR also sends to the (H-)PCF the information on whether the network slices are mutually exclusive as described in steps 6 and 7 of clause 4.16.11 of 3GPP TS 23.502 V16.6.0. This information on whether the network slices are mutually exclusive is also referred to herein as "information that indicates whether the network slices are mutually exclusive" and, in some embodiments, is or includes a list of mutually exclusive network slices.
  - Step 21b.8: In step 21b.8, the PCF 210 uses the Application IDs from the UE 112 and the information on whether the network slices are mutually exclusive as input to the creation of the URSP rules to send to the UE 112 using the UE Configuration Update for transparent UE Policy delivery procedure as described in step 8 of clause 4.16.11 of 3GPP TS 23.502 V16.6.0. During step 21b.8, the created URSP rules are sent from the PCF 210 to the UE 112 via the AMF 200.
  - Steps 21b.9 and 21b.10: See steps 9 and 10 of clause 4.16.11 of 3GPP TS 23.502 V16.6.0.
- Steps 22 through 25: See steps 22 through 25 of clause 4.2.2.2.2 of 3GPP TS 23.502 V16.6.0.

After the Registration procedure, the UE 112 may trigger a new registration with a Requested NSSAI as per the received URSP rules.

Scenario 2

Another possibility is when the UE 112 registers to the network, the UE 112 may provide the "App_IDs" and the "App_ID indication" to the AMF 200 in the Registration Request, instead of the network requesting for them. In other words, in the example embodiment of FIGS. 4A and 4B, the Registration Request of steps 1 and 2 includes, in Scenario 2, the Application IDs of the applications used by the UE 112 and, optionally, the App_ID indication. Note that the App_ID indication may be optional in the sense that the inclusion of the Application IDs in the Registration Request may be viewed as an implicit indication that the UE 112 has this capability. Also note that, since the Registration Request includes the Application IDs, the AMF 200 does not request the Application IDs in the Identity Request of step 6 or receive the Application IDs in the Identity Response of step 7, as is the case for Scenario 1.

Scenario 2 may also cover the case where the UE 112 provides the Application IDs and optionally the App_ID indication to the network every time the UE 112 registers or when the Application IDs of the UE 112 have changed. The later includes the cases where the UE 112 changes the applications it wishes to use and can convey the same to the network. After receiving the Application IDs from the UE 112, the AMF 200 stores these Application IDs under the UE context and the rest of the procedural steps are the same as described for Scenario 1 above.

Scenario 3

It is also possible to include in the URSP rules sent by the PCF 210 to the UE 112 to include only Application IDs for network slices that are not mutually exclusive independent of the UE preference.

Scenario 4

When the UE 112 indicates that it wishes to use an application which is not in the URSP, a new URSP rule is proposed conveying to the UE 112 that the currently requested application cannot be used.

Figure 5:
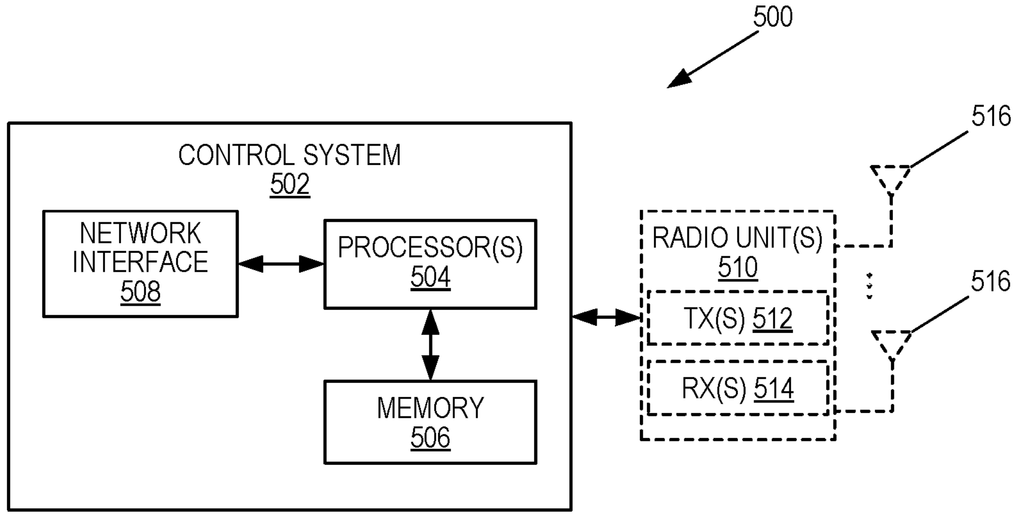
FIGS. 5, 6, and 7 are schematic block diagrams of example embodiments of a network node.

FIG. 5 is a schematic block diagram of a network node 500 according to some embodiments of the present disclosure. Optional features are represented by dashed boxes. The network node 500 may be, for example, a radio access node that implements all or part of the functionality of a base station 102 or 106 or a network node that implements all or part of the functionality of a core network function (e.g., AMF, PCF, or the like), as described herein. As illustrated, the network node 500 includes a control system 502 that includes one or more processors 504 (e.g., Central Processing Units (CPUs), Application Specific Integrated Circuits (ASICs), Field Programmable Gate Arrays (FPGAs), and/or the like), memory 506, and a network interface 508. The one or more processors 504 are also referred to herein as processing circuitry. In addition, if the network node 500 is a radio access node, the network node 500 may include one or more radio units 510 that each includes one or more transmitters 512 and one or more receivers 514 coupled to one or more antennas 516. The radio units 510 may be referred to or be part of radio interface circuitry. In some embodiments, the radio unit(s) 510 is external to the control system 502 and connected to the control system 502 via, e.g., a wired connection (e.g., an optical cable). However, in some other embodiments, the radio unit(s) 510 and potentially the antenna(s) 516 are integrated together with the control system 502. The one or more processors 504 operate to provide one or more functions of the network node 500 as described herein (e.g., one or more functions of a radio access node (also referred to herein as a RAN node or (R)AN node as described herein or one or functions of a core network function such as, e.g., an AMF or PCF as described herein). In some embodiments, the function(s) are implemented in software that is stored, e.g., in the memory 506 and executed by the one or more processors 504.

Figure 6:
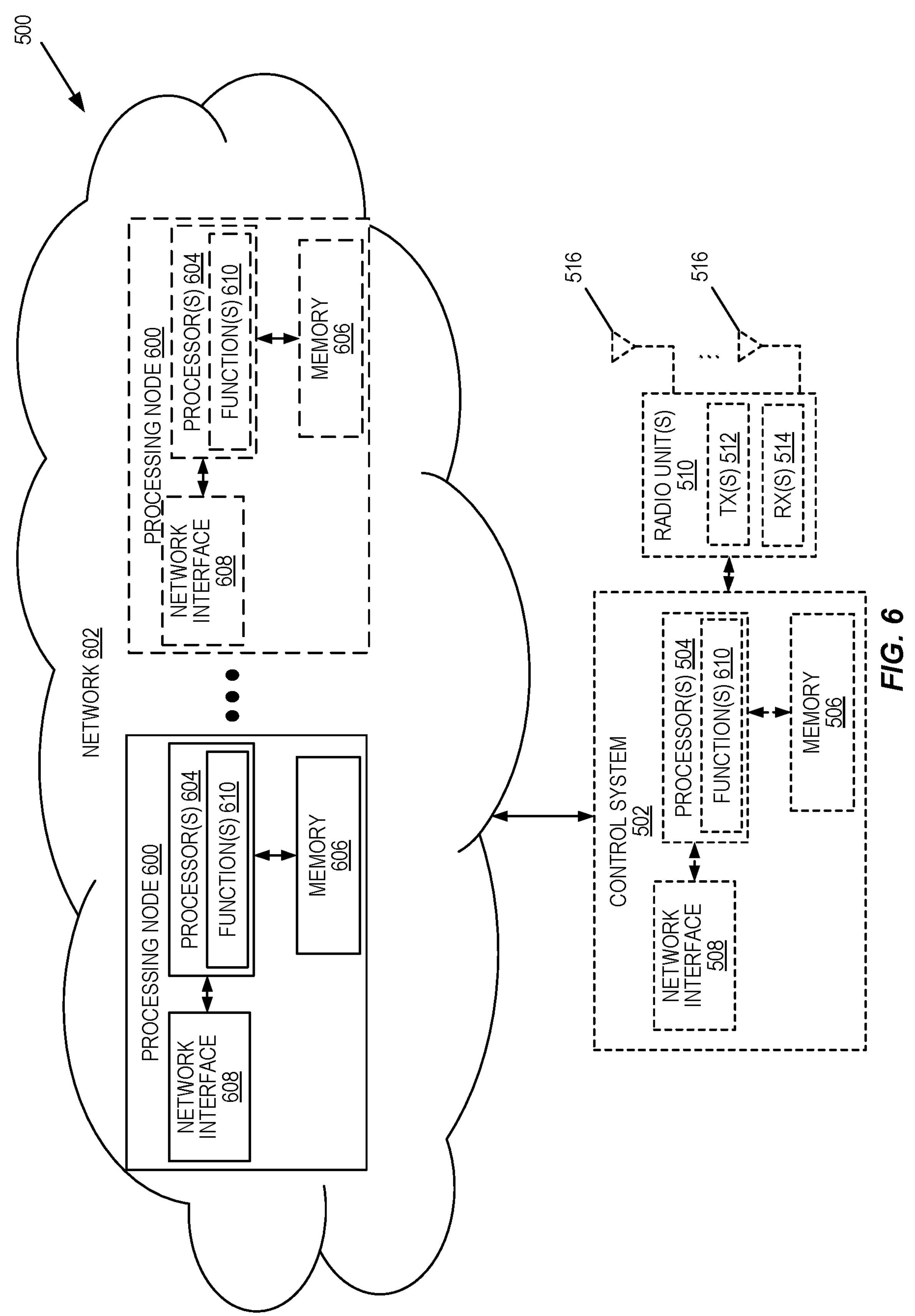

FIG. 6 is a schematic block diagram that illustrates a virtualized embodiment of the network node 500 according to some embodiments of the present disclosure. Again, optional features are represented by dashed boxes. As used herein, a "virtualized" network node is an implementation of the network node 500 in which at least a portion of the functionality of the network node 500 is implemented as a virtual component(s) (e.g., via a virtual machine(s) executing on a physical processing node(s) in a network(s)). As illustrated, in this example, the network node 500 includes one or more processing nodes 600 coupled to or included as part of a network(s) 602. Each processing node 600 includes one or more processors 604 (e.g., CPUs, ASICs, FPGAs, and/or the like), memory 606, and a network interface 608. If the network node 500 is a radio access node, the network node 500 may also include the control system 502 and/or the one or more radio units 510, as described above. If present, the control system 502 or the radio unit(s) are connected to the processing node(s) 600 via the network 602.

In this example, functions 610 of the network node 500 described herein are implemented at the one or more processing nodes 600 or distributed across the one or more processing nodes 600 and the control system 502 and/or the radio unit(s) 510 in any desired manner. In some particular embodiments, some or all of the functions 610 of the network node 500 described herein are implemented as virtual components executed by one or more virtual machines implemented in a virtual environment(s) hosted by the processing node(s) 600.

In some embodiments, a computer program including instructions which, when executed by at least one processor, causes the at least one processor to carry out the functionality of the network node 500 or a node (e.g., a processing node 600) implementing one or more of the functions 610 of the network node 500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 7:
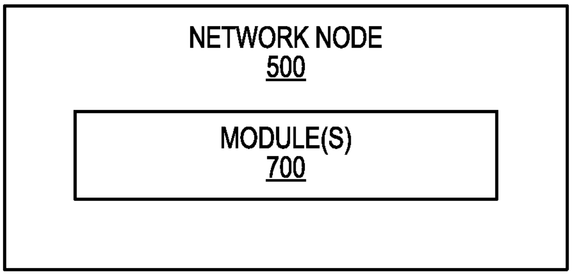

FIG. 7 is a schematic block diagram of the network node 500 according to some other embodiments of the present disclosure. The network node 500 includes one or more modules 700, each of which is implemented in software. The module(s) 700 provide the functionality of the network node 500 described herein. This discussion is equally applicable to the processing node 600 of FIG. 6 where the modules 700 may be implemented at one of the processing nodes 600 or distributed across multiple processing nodes 600 and/or distributed across the processing node(s) 600 and the control system 502.

Figure 8:
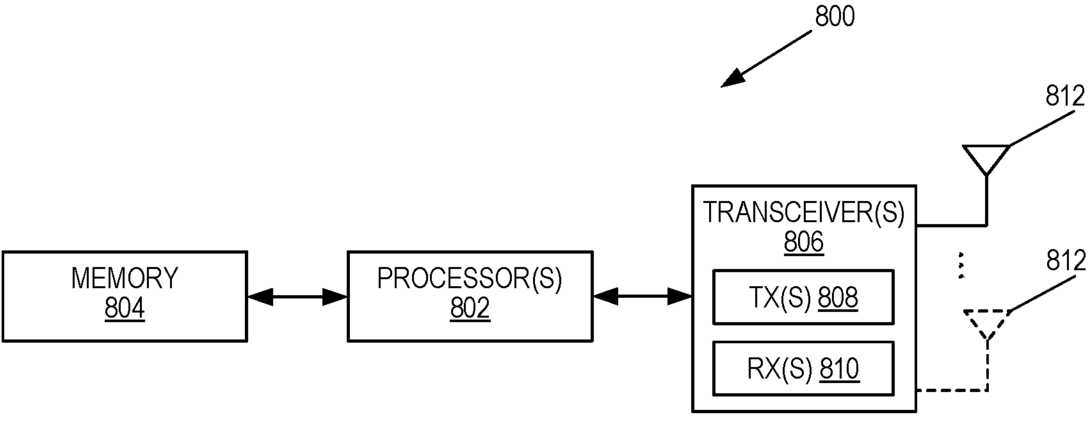
FIGS. 8 and 9 are schematic block diagrams of example embodiments of a wireless communication device or UE.

FIG. 8 is a schematic block diagram of a wireless communication device 800 (e.g., a UE) according to some embodiments of the present disclosure. As illustrated, the wireless communication device 800 includes one or more processors 802 (e.g., CPUs, ASICs, FPGAs, and/or the like), memory 804, and one or more transceivers 806 each including one or more transmitters 808 and one or more receivers 810 coupled to one or more antennas 812. The transceiver(s) 806 includes radio-front end circuitry connected to the antenna(s) 812 that is configured to condition signals communicated between the antenna(s) 812 and the processor(s) 802, as will be appreciated by on of ordinary skill in the art. The processors 802 are also referred to herein as processing circuitry. The transceivers 806 are also referred to herein as radio circuitry. In some embodiments, the functionality of the wireless communication device 800 described above may be fully or partially implemented in software that is, e.g., stored in the memory 804 and executed by the processor(s) 802. Note that the wireless communication device 800 may include additional components not illustrated in FIG. 8 such as, e.g., one or more user interface components (e.g., an input/output interface including a display, buttons, a touch screen, a microphone, a speaker(s), and/or the like and/or any other components for allowing input of information into the wireless communication device 800 and/or allowing output of information from the wireless communication device 800), a power supply (e.g., a battery and associated power circuitry), etc.

In some embodiments, a computer program including instructions which, when executed by at least one processor, causes the at least one processor to carry out the functionality of the wireless communication device 800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
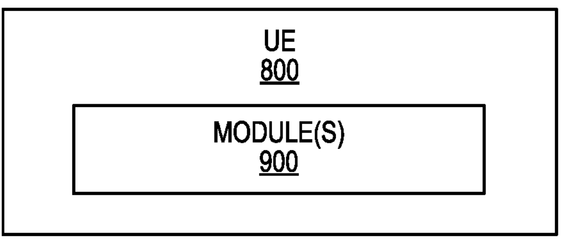

FIG. 9 is a schematic block diagram of the wireless communication device 800 according to some other embodiments of the present disclosure. The wireless communication device 800 includes one or more modules 900, each of which is implemented in software. The module(s) 900 provide the functionality of the wireless communication device 800 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

One example implementation of at least some aspects of the embodiments described herein is presented below as changes to 3GPP TR 23.700-40:

******** Start Changes to 3GPP TR 23.700-40 ********

6 Solutions 6.0 Mapping Solutions to Key Issues

TABLE 6.0-1

Mapping of Solutions to Key Issues

| Solution#'s | Solution Titles | Key Issue#'s |
|---|---|---|
| 1 | PCF measurement based Network Slice SLA control for Maximum Number of UEs parameter | 1 |
| 2 | Max number of UEs per Network Slice control at registration | 1 |
| 3 | AMF/NSSF based counting of UEs in a Network Slice | 1 |
| 4 | NWDAF enhancements for supporting of network slice quota on the maximum number of UEs | 1 |
| 5 | NWDAF enhancements for supporting of network slice quota on the maximum number of PDU Sessions | 2 |
| 6 | PCF-based counting of PDU Sessions in a Network Slice | 2 |
| 7 | Support of Network Slice SLA for Maximum Number of PDU sessions parameter | 2 |
| 8 | AMF and O&M based solution | 1, 2 & 4 |
| 9 | Monitoring multiple quotas of number of UEs/PDU Sessions per S-NSSAI at NWDAF | 1, 2 & 4 |
| 10 | Max number of PDU Sessions per Network Slice control via NSQ function | 2 |
| 11 | Handling maximum number of sessions using NF status | 2 |
| 12 | NSQ assisted dynamic adjustment of data rate per slice via NAS signaling | 5 |
| 13 | Limitation of data rate per network slice in UL and DL per UE | 3 |
| 14 | UE-Slice-AMBR adjustment to meet the limitation of data rate per Network Slice | 5 |
| 15 | Using Back-off timer | 1 |
| 16 | Slice data rate enforcement and dynamic adjustment | 5 |
| 17 | Support of radio spectrum attribute by CN assisted RAN control | 7 |
| 18 | Proactive Slice Quota Management in AMF | 1, 2, 4, 5 |
| 19 | Support of network slice quota control and enforcement | 1, 2 & 5 |
| 20 | Reusing existing QoS model to ensure that to limit the Maximum throughput UL/DL in a Network slice is not exceeded | 3 & 5 |
| 21 | Limitation of data rate per network slice in UL and DL per UE without RAN involvement | 3 |
| 22 | Solution on limitation of data rate per Network Slice in UL and DL per UE | 3 |
| 23 | Network slice quota event notification | 4 |
| 24 | NSQ assisted dynamic adjustment of data rate per slice via user plane adjustment | 5 |
| 25 | Enforcement of MBR UL/DL per S-NSSAI | 5 |
| 26 | Network controlled enforcement of simultaneous usage of network slices based on user preference | 6 |
| 27 | Network slices simultaneous usage incompatibility support | 6 |
| 28 | Constraints on simultaneous use of the network slice | 6 |
| 29 | Providing Operating Band Information in the Configured NSSAI | 7 |
| 30 | Preferred frequency bands in Configured NSSAI | 7 |
| 31 | Steering the UE to a network slice in a different frequency band | 7 |
| 32 | Operator quota control policy on the number of PDU session | 2 |
| 33 | Event notification of Slice SLA attributes | 4 |
| 34 | AF interaction for event notification | 4 |
| 35 | Quota enforcement considering service type | 2 |
| 36 | Handover of a PDU session | 2 |
| 37 | Data rate control per network slice per UE | 3 |
| 38 | Network slice quota control and enforcement provided by CHF based solution | 1 & 2 |
| 39 | Support registration for incompatible network slice(s) in UE's current serving RA or different one | 6 |
| 40 | Separate SUPI/GPSI per isolated set of S-NSSAIs | 6 |
| 41 | Simultaneous use of the network slice via Configured NSSAI | 6 |
| 42 | UE handling of constraints on simultaneous use of network slices based on network assistance | 6 |

TABLE 6.0-1-continued

Mapping of Solutions to Key Issues

| Solution#'s | Solution Titles | Key Issue#'s |
|---|---|---|
| 43 | UE Slice Maximum Bit Rate related event notification | 4 |
| 44 | RAN controlled steering of the UE to a network slice in a different frequency band | 7 |
| X | Ensuring network control when the UE is accessing simultaneous network slices | 6 |

6.X Solution #<X> Ensuring Network Control of Simultaneous Access to Network Slices with Application Awareness 6.X.1 Introduction This is a solution to Key Issue #6, "Constraints on simultaneous use of the network slice".

This solution maintains network control, without disclosing the network configuration, when the UE needs to access mutually exclusive network slices simultaneously.

Currently, the URSP rules are provided to the UE to use, amongst others, specific network slices (S-NSSAIs) for certain applications. However, certain network slices cannot be used simultaneously due to the mutually exclusive nature of the network slices and this mutually exclusive nature of the slices is currently not verified at the network side when/before sending URSP rules to the UE. And if the UE has such network slices subscribed for, there is a need for the network to verify the mutually exclusive nature of the network slices and provide as good connectivity as possible for the applications the UE wishes to use. This solution addresses the above problem by applying the current URSP model, where the UE has the Application IDs for the applications the UE wants to use, so as to enable the most optimal registration for the network slices and delivery of optimal URSP rules to the UE.

6.X.2 High-Level Description

The key aspects and assumptions of the solution are summarized as follows:

- The UDM subscription may include some network slices that are incompatible or mutually exclusive from each other.
- The UE registers to the network and indicates that it supports providing the Application IDs to the network upon request.
- The network requests for Application IDs from the UE, based on the subscription information stored and the network policy to initiate this request.
- The UE provides the Application IDs to the network upon request and each time the Application IDs the UE wants to use changes.
- The network creates the appropriate URPS rules and sends them to the UE.

The feasibility of above assumptions for a solution can be described as follows:

- The network has a configuration of mutually exclusive slices. UDM subscription includes network slices that are incompatible or mutually exclusive from each other. PCF knows which network slices that certain applications can use. That is, the network knows which network slice is allocated to an application the UE wants to use. The network provides the UE via URSP with a set of rules including network slice and Application ID information.
- When the UE registers to the network, the UE may provide an indication to the AMF in Registration
  - Request about its capability to provide Application IDs, and the network subsequently requests for the Application IDs based on this.
- The network (AMF based on local policy) upon knowing that the UE can provide the Application IDs initiates a request for the Application IDs from the UE
- Upon receiving the Application IDs from the UE, the AMF provides this information to the PCF
  - The PCF provides URSP rules to the UE taking into account the Application IDs provided by the UE
- The UE uses the URSP rules to create a suitable Requested NSSAI.
- When the UE changes the used applications the UE sends the used Application IDs to the network in a Registration request, and the network creates new suitable URSP rules and sends them to the UE, and the UE may create a new Requested NSSAI if suitable as per the URSP.

6.X.3 Procedures

Figure 10A:
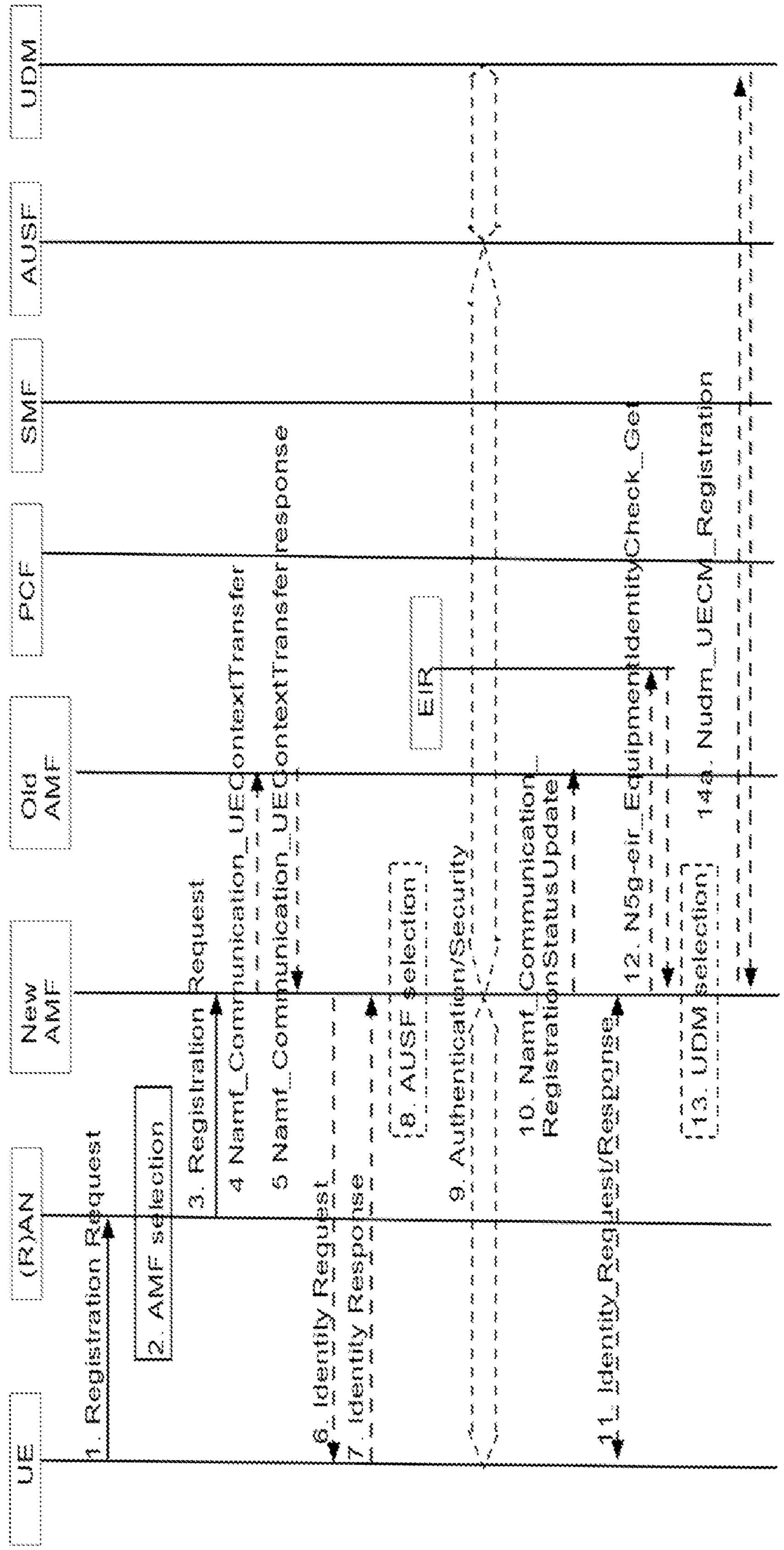
FIGS. 10A and 10B illustrate an example implementation of a procedure for ensuring network control of simultaneous access to network slices with application awareness.
Figure 10B:
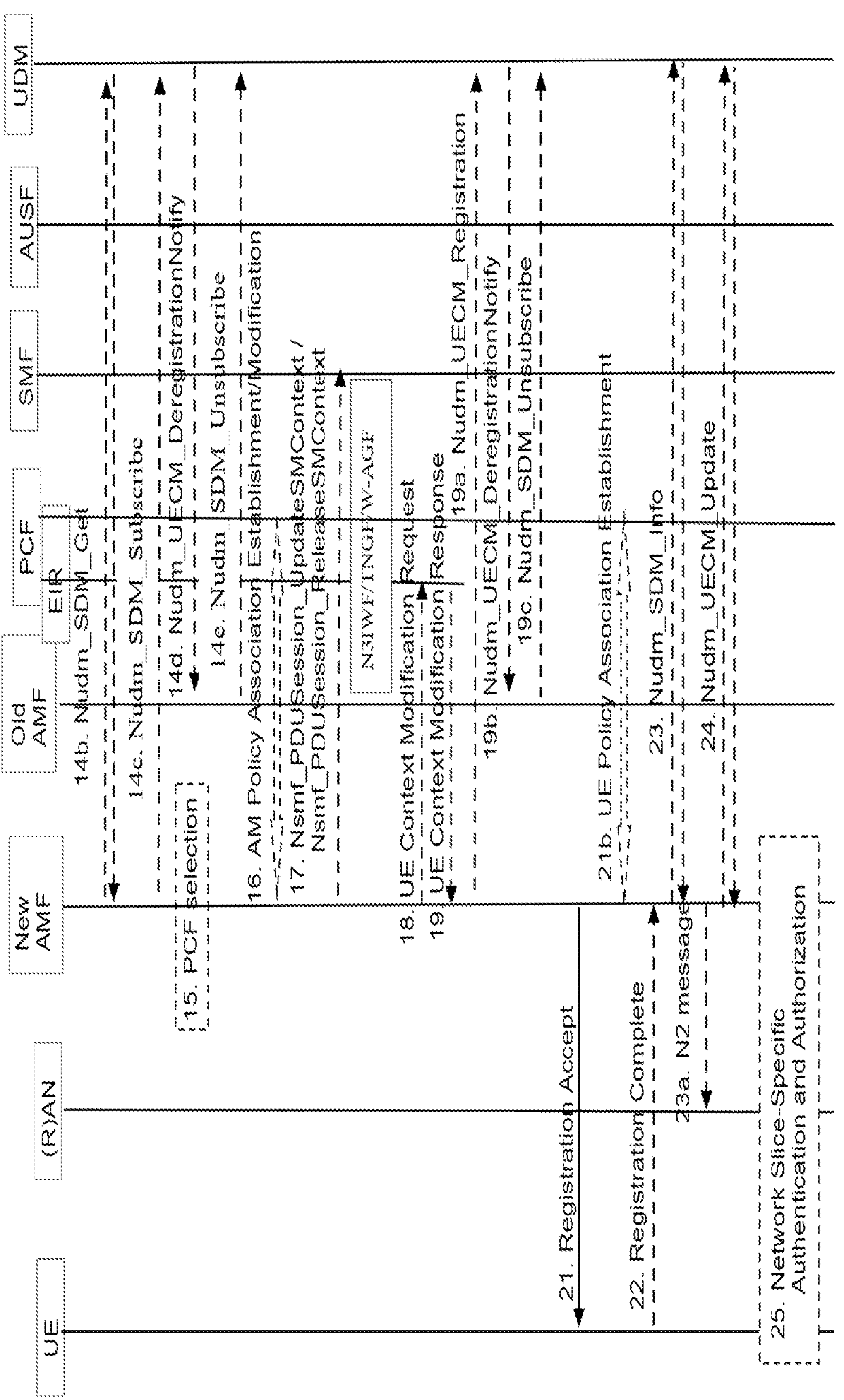

[See FIGS. 10A and 10B]

The following steps are changed in Registration Procedure, described in 3GPP TS 23.502 [6] clause 4.2.2.2.2:

Step 1: The UE includes a new capability indication to the network that it can provide its Application IDs to the network, e.g. as part of the UE MM Core Network Capability.

Based on local configuration and optionally based on the subscription information the AMF requests the UE to provide the used Application IDs. This can be done as part of step 6 and 7, or as part of new messages.

Step 21b. If received from the UE, the AMF provides the used Application IDs to the PCF in step 2 of clause 4.16.11. The PCF uses the used Application IDs as input to the creation of the URSP rules to send to the UE using the UE Configuration Update procedure for transparent UE Policy delivery (see clause 4.2.4.3 of TS 23.502 [6]). Further in step 6 of clause 4.16.11, the (H-)PCF gets the subscribed S-NSSAI from UDR as per TS 23.503[xx] and UDR also sends whether network slices are mutually exclusive.

After the Registration procedure, the UE may trigger a new registration with a Requested NSSAI as per the received URSP rules.

6.X.4 Impacts on Services, Entities, and Interfaces

- UE Impact
  - New capability indication to the network about its capability to share the Application IDs
  - Ability to send Application IDs the UE wants to use to the network, upon request and when they are changing
- 5GC Impact
  - AMF/PCF requesting for Application IDs of the UE
  - PCF modifying URSP rules based on used Applications by the UE and based on which network slices that are incompatible or mutually exclusive from each

******** End Changes to 3GPP TR 23.700-40 ********

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Those skilled in the art will recognize improvements and modifications to the embodiments of the present disclosure. All such improvements and modifications are considered within the scope of the concepts disclosed herein.

The invention claimed is:

1. A method performed by a wireless communication device for a cellular communications system, the method comprising:

sending, to an Access and Mobility Management Function, AMF, application identifiers, IDs, of applications supported by the wireless communication device; and receiving, from a Policy and Control Function, PCF, via the AMF, one or more User Equipment, UE, Route Selection Policy, URSP, rules generated by the PCF, based on the application IDs of the applications supported by the wireless communication device and based on information obtained by the PCF about one or more mutually exclusive network slices; and when the wireless communication device changes the applications to be used from the applications supported by the wireless communication device: sending, to the AMF in a registration request message, application IDs of the changed applications; and receiving, from the PCF via the AMF, one or more new URSP rules generated by the PCF based on the application IDs of the changed applications and based on information obtained by the PCF about one or more mutually exclusive network slices.

2. The method of claim 1, further comprising sending, to the AMF, an indication that the wireless communication device has a capability to provide the application IDs of the applications supported by the wireless communication device and applications that the wireless communication device wants to use.

3. The method of claim 2, wherein sending the indication comprises sending a registration request to the AMF, the registration request comprising the indication.

4. The method of claim 1, wherein sending the application IDs of applications that the wireless communication device wants to use and the applications supported by the wireless communication device to the AMF comprises:

receiving a request for the application IDs from the AMF; and sending the application IDs to the AMF in response to the request.

5. The method of claim 4, wherein the application IDs are sent from the wireless communication device to the AMF during a registration procedure, and:

receiving the request for the application IDs comprises receiving an identity request message from the AMF, the identity request message comprising the request for the application IDs; and sending the application IDs to the AMF comprises sending an identity response message to the AMF in response to the identity request, the identity response message comprising the application IDs.

6. The method of claim 1, wherein sending the application IDs of applications supported by the wireless communication device to the AMF comprises sending a registration request to the AMF, the registration request comprising the application IDs.

7. A wireless communication device adapted to:

send, to an Access and Mobility Management Function, AMF, application identifiers, IDs, of applications supported by the wireless communication device; and receive, from a Policy and Control Function via the AMF, one or more User Equipment, UE, Route Selection Policy, URSP, rules generated by the PCF, based on the application IDs of the applications that the wireless communication device and based on information obtained by the PCF about one or more mutually exclusive network slices; and when the wireless communication device changes the applications to be used from the applications supported by the wireless communication device: send, to the AMF in a registration request, application IDs of the changed applications that the wireless communication; and receive, from the PCF via the AMF, one or more new URSP rules generated by the PCF based on the application IDs of the changed applications and based on information obtained by the PCF about one or more mutually exclusive network slices.

8. The wireless communication device of claim 7, wherein the wireless communication device is further adapted to:

send, to the AMF, an indication that the wireless communication device has a capability to provide the application IDs of the applications supported by the wireless communication device and applications that the wireless communication device wants to use.

9. The wireless communication device of claim 8, wherein sending the indication comprises sending a registration request to the AMF, the registration request comprising the indication.

10. A wireless communication device comprising:

one or more transmitters;

one or more receivers; and processing circuitry associated with the one or more transmitters and the one or more receivers, the processing circuitry configured to cause the wireless communication device to:

send, to an Access and Mobility Management Function, AMF, application identifiers, IDs, of applications supported by the wireless communication device; and receive, from a Policy and Control Function, PCF, via the AMF, one or more User Equipment, UE, Route Selection Policy, URSP, rules generated by the PCF, based on the application IDs of the applications that the wireless communication device and based on information obtained by the PCF about one or more mutually exclusive network slices;

when the wireless communication device changes the applications to be used from the applications supported by the wireless communication device: send, to the AMF in a registration request, application IDs of the changed applications that the wireless communication device; and receive, from the PCF via the AMF, one or more new URSP rules generated by the PCF based on the application IDs of the changed applications and based on information obtained by the PCF about one or more mutually exclusive network slices.

11. The wireless communication device of claim 10, wherein the processing circuitry is further configured to cause the wireless communication device to:

send, to the AMF, an indication that the wireless communication device has a capability to provide the application IDs of the applications supported by the wireless communication device and applications that the wireless communication device wants to use.

12. The wireless communication device of claim 11, wherein sending the indication comprises sending a registration request to the AMF, the registration request comprising the indication.

13. A method performed by an Access and Mobility Management Function, AMF, for a cellular communications system, the method comprising:

receiving, from a wireless communication device, application identifiers, IDs, of applications supported by the wireless communication device; and sending, to a Policy and Control Function, PCF, the application IDs of the applications supported by the wireless communication device;

sending one or more URSP rules, generated by the PCF based on the application IDs of the applications supported by the wireless communication device and based on information obtained by the PCF about the one or more mutually exclusive network slices, to the wireless communication device; and receiving, from the wireless communication device in a registration request, application IDs of changed applications when the wireless communication device changes the applications to be used from the applications supported by the wireless communication device;

sending, to the PCF, the application IDs of the changed applications; and sending one or more new URSP rules, generated by the PCF based on the application IDs of the changed applications and based on information obtained by the PCF about the one or more mutually exclusive network slices, to the wireless communication device.

14. The method of claim 13, further comprising receiving, from the wireless communication device, an indication that the wireless communication device has a capability to provide the application IDs of the applications supported by the wireless communication device and applications that the wireless communication device wants to use.

15. The method of claim 14, wherein receiving the indication comprises receiving a registration request from the wireless communication device, the registration request comprising the indication.

16. The method of claim 13, further comprising:

sending, to the wireless communication device, a request for the application IDs of applications that the wireless communication device wants to use and the applications supported by the wireless communication device;

wherein receiving, from the wireless communication device, the application IDs of applications that the wireless communication device wants to use and the applications supported by the wireless communication device comprises receiving the application IDs from the wireless communication device in response to the request.

17. The method of claim 13, further comprising storing the application IDs in association with an identity of the wireless communication device.

18. The method of claim 13, further comprising storing the application IDs in a context of the wireless communication device.

19. A method performed by a Policy and Control Function, PCF, for a cellular communications system, the method comprising:

receiving, from an Access and Mobility Management Function, AMF, application IDs of applications supported by a wireless communication device;

obtaining information about one or more mutually exclusive network slices;

generating one or more User Equipment, UE, Route Selection Policy, URSP, rules for the wireless communication device based on the application IDs of the applications supported by the wireless communication device and based on the information about the one or more mutually exclusive network slices;

sending the one or more URSP rules to the wireless communication device via the AMF;

receiving, from the AMF, the application IDs of changed applications when the wireless communication device changes the applications to be used from the applications supported by the wireless communication device;

generating one or more new URSP rules for the wireless communication device based on the application IDs of the changed applications and based on the information about the one or more mutually exclusive network slices; and sending the one or more new URSP rules to the wireless communication device via the AMF.

* * * * *